United States Patent Office 3,056,185
Patented Oct. 2, 1962

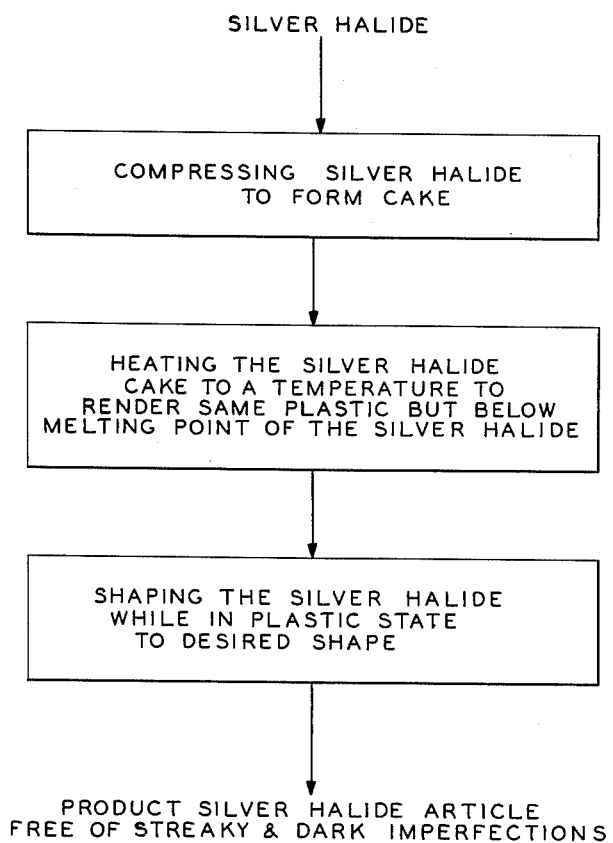

3,056,185
PRODUCTION OF SHAPED SILVER HALIDES
Otto William Langhans, Madison, N.J., assignor to Engelhard Industries, Inc., Newark, N.J., a corporation of Delaware
Filed Nov. 22, 1960, Ser. No. 70,937
10 Claims. (Cl. 25—156)

This invention relates to the production of shaped silver halides, and more particularly to a method for shaping a silver halide to form sheets, tubes, strands, rods or other shaped articles while avoiding introducing material amounts of impurities into the silver halide with the method and hence eliminating undesirable streaky and dark imperfections in the finished product.

Silver chloride has been produced in sheet form heretofore by a procedure involving drying silver chloride powder, then melting the silver chloride powder in a suitable crucible and pouring the melt at temperature of about 550° C.–600° C. into a mold to form an ingot. The ingot, after removal from the mold, was heated to transform the same into plastic state, and then hot-rolled to form sheets. This method has been disadvantageous for the reason that the finished product silver chloride sheets not infrequently contained considerable amounts of impurities which show up in the sheets as streaky and dark imperfections. The silver chloride powder as produced was of high purity but was believed to be contaminated during the melting procedure, by reasons of decomposition of the silver chloride during the melting cycle and crucible disintegration. Further, additional impurities may be picked up from the mold walls during casting of the bar. These impurities are commercially unsatisfactory in the sheets for the reason that the silver chloride sheets are used as battery plates, and hence it is important that the sheets be of high purity.

After considerable investigation of the cause of the impurities and imperfections in the silver chloride finished sheets, it was confirmed that the impurities were introduced during the melting procedure and were probably decomposed silver chloride impurities with the decomposition occurring during the melting cycle, and also impurities introduced due to crucible distintgration and impurities picked up from the mold walls during casting of the bar. While it is possible to skim the melt and remove portions of these impurities prior to casting the ingot, skimming is disadvantageous because time consuming and not removing the impurities to the extent desired.

In accordance with the present invention, a method is provided for producing a shaped silver halide article, for instance silver halide sheets, tubes, strands, rods, etc., which are free or substantially free of the streaky and dark imperfections present in the silver chloride finished sheets produced by the prior art process. The method involves compressing a mass of the silver halide, for instance silver chloride to form a cake, heating the cake to a temperature sufficient to render the cake plastic, i.e. shapeable or moldable, but below the melting point of the silver halide, and shaping the silver halide cake while in plastic state into the article of the desired shape. It is of utmost importance that the silver halide not be melted, which melting is effected in the prior art process, inasmuch as it was found that only by eliminating the melting procedure was there produced silver halide sheets free of the undesirable streaky and dark imperfections. The method of this invention, in addition to being a considerable improvement over the prior art method employing the melting procedure for the reason that the finished product atricles are free of streaky and dark imperfections, is also an improvement because more economical, efficient and simpler than the prior art method.

The method of this invention, in addition to producing flat strip stock, produces articles of specific and more complicated shapes enhancing large surface areas per unit weight material. Such shapes are preferred in the construction of silver chloride battery components.

This method also enables the introduction of silver oxide, tellurium, silver telluride, selenium, and silver selenide into the silver chloride as nonmelting additives or additives with considerable high melting points, which normally cannot be introduced by melting. Such additives are introduced to influence the electrochemical behavior of the chloride component and therefore the general behavior of the finished battery. The elimination of the melting procedure constitutes a substantial saving in production costs and achieves a considerably reduced scrap generation in subsequent operations, the higher scrap generation of the prior art method resulting in increased labor and time requirements and at times being a nuisance.

Silver bromide or silver iodide can be utilized instead of the silver chloride, if desired. However, the silver chloride is preferred. The silver halide can be used either in cake form or as a powder, preferably the latter. The silver halide used is of high purity, typically of 99.9 percent or higher purity.

The silver chloride can be prepared by reacting silver nitrate with HCl to precipitate the silver chloride followed by separating the precipitate from the mother liquor, then washing the silver chloride, and drying. The following example illustrates the preparation of silver chloride:

Silver nitrate crystals of A.C.S. grade in the amount of 250.7 avd. ozs. were placed in a crock. Demineralized water was added to the silver nitrate crystals in the crock to make a 0.2 M solution, and the volume of this solution was made up to 210 liters by addition of the demineralized water. A 0.5 M HCl solution was made up by adding 1.4 liters of 12 M HCl (of 37.0 percent HCl concentration) to demineralized water. 99 liters of the 0.5 M HCl solution was added to the silver nitrate solution by a glass syphon while stirring the silver nitrate solution. The mixture was permitted to stand to settle out, and the mother liquor was then decanted off. The precipitate of silver chloride present in the reaction mixture in the crock was then filtered on a stoneware porous filter of medium porosity. The filter cake was washed 20 times with 0.1 M nitric acid on the filter plate, and the washed cake was transferred to large Pyrex trays and dried at 110° C. for 48 hours. The dried silver chloride lumps were then broken up to 40 mesh powder. All work was done under actinic light to prevent decomposition by light.

The silver bromide and silver iodide can be prepared by conventional methods well known in the art.

The accompanying drawing is a flow sheet of the method of the present invention.

In a specific embodiment of the invention, the silver halide is compressed in a mold under high pressure of typically about 20,000 p.s.i. The compression agglomerates and densifies the particles to form a cake. The cake is typically a self-sustaining cake preferably in the form of a bar when sheets are to be formed. When a silver halide cake is used as a starting material, the cake is compressed into a typically self-sustaining cake of considerably greater density than the starting cake. The cake is then heated to a temperature wherein it is plastic, i.e. shapeable, extrudable or moldable but below the melting point of the particular silver halide employed which is below 851° F. when silver chloride is employed, below 810° F. when silver bromide is utilized, and below 996.8° F. in the case of silver iodide. A preferred temperature for the heating is between about 716° F. and 752° F. with silver chloride, between about 698° F. and 734° F.

with silver bromide, and between about 878° F. and 914° F. with silver iodide. It is essential that the silver halide not be melted as is done in the prior art method previously discussed as it was found that only by eliminating the melting procedure was there produced silver chloride sheets free of the streaky and dark imperfections and impurities. The warm, plastic cake is then shaped or molded to the particular shape desired.

When forming silver chloride sheets for use as battery plates, the plastic cake is rolled, while warm, between the nip of a pair of closely adjacent driven rolls heated to temperature of typically about 140°–160° F. The plastic silver chloride mass can be passed between the rolls as many times as desired to obtain the desired reduction in thickness and the particular thickness of sheet required. If desired, after warm rolling, the sheets can be cold rolled to still further reduce the thickness. At the proper gauge size the sheets are then slit to width, and then cut to requirements.

Instead of shaping the silver halide cake by rolling to form sheets, the heated plastic mass may be extruded into desirable shapes, such as tubes, sheet stock, rods, strands, etc., which may be required in the application of battery components. Some of these extrusions may be designed to obtain greater surface area which is desirable in battery construction. These shapes can be formed by extruding the plastic silver chloride mass heated at a temperature between about 716° F. and 752° F., which is below the melting point of the silver chloride, using extrusion equipment well known to the art. The silver halide mass can also be formed into strands suitable for weaving to form gauzes, by extruding the plastic silver halide mass from heated extrusion chambers through the orifices of a spinneret or nozzle having orifices of a cross-sectional shape corresponding to strands of a desired surface area and shape. The strands can then be woven into gauzes which have greater surface area than the sheets due to the individual strands, and hence are more advantageous for use as plates in batteries.

When shaping the sheets in accordance with the present invention, the sheets can be molded to form spaced raised indentations therein to give a "waffle-like" design in the sheets, which is preferred over the flat surface sheets because of the considerable increase in surface area. These "waffle-like" sheets are preferred for use in battery plates over the flat surface sheets.

It will be obvious to those skilled in the art that many modifications may be made within the scope of the present invention without departing from the spirit thereof, and the invention includes all such modifications.

What is claimed is:

1. A method for producing a shaped silver halide article, which comprises compressing a mass of halide of silver of the group consisting of the chloride, bromide and iodide of silver to form a cake, heating the cake to a temperature sufficient to render the cake plastic but below the melting point of the silver halide, and shaping the silver halide cake while in plastic state into an article of the desired shape.

2. The method of claim 1 wherein the silver halide is silver chloride.

3. A method for producing a silver halide sheet, which comprises compressing a mass of halide of silver of the group consisting of the chloride, bromide and iodide of silver to form a cake, heating the silver halide cake to a temperature sufficient to render the cake plastic but below the melting point of the silver halide, and shaping the cake while in plastic state into a silver halide sheet substantially free of streaky and dark imperfections.

4. The method of claim 3 wherein the silver halide is silver chloride.

5. The method for producing a silver halide tube, which comprises compressing a mass of halide of silver of the group consisting of chloride, bromide and iodide of silver to form a cake, heating the cake to a temperature sufficient to render the cake plastic but below the melting point of the silver halide, and shaping the cake while in plastic state into a tube substantially free of streaky and dark imperfections.

6. The method of claim 5 wherein the silver halide is silver chloride.

7. A method for producing a shaped silver halide article which comprises compressing a mass of powdered halide of silver of the group consisting of the chloride, bromide, and iodide of silver under high pressure to agglomerate the silver halide discrete powder particles to form a self-sustaining cake, heating the cake to a temperature sufficient to render the cake plastic but below the melting point of the silver halide, and shaping the cake while in plastic state into an article of the desired shape.

8. A method for producing a silver chloride sheet, which comprises compressing a mass of powdered silver chloride under high pressure to agglomerate the silver chloride discrete powder particles to form a self-sustaining bar, heating the bar to a temperature between about 716° F. and about 752° F. to render the bar plastic but unmelted, and shaping the bar while in plastic state into a silver chloride sheet free of streaky and dark imperfections.

9. The method of claim 8 further characterized in that the heated bar is shaped into a sheet by passing the bar while in plastic state between a pair of closely adjacent, heated, driven rolls.

10. A method for producing a silver chloride tube, which comprises compressing a mass of powdered silver chloride under high pressure to agglomerate the silver chloride discrete particles to form a self-sustaining cake, heating the cake to a temperature between about 716° F. and about 752° F. to render the cake plastic but unmelted, and extruding the cake while in plastic state to form a silver chloride tube substantially free of streaky and dark imperfections.

References Cited in the file of this patent

Moeller et al.: "A Metallurgical Investigation of Silver Chloride," Chicago (1950), pp. 1–3, 7–8, 20 and 26–28.